United States Patent [19]

Sturwold et al.

[11] 3,925,589

[45] Dec. 9, 1975

[54] ESTERS OF POLYOXYALKYLENE GLYCOLS AND MIXED DIBASIC ACIDS AS FIBER FINISHES

[75] Inventors: Robert J. Sturwold; Fred O. Barrett, both of Cincinnati, Ohio

[73] Assignee: Emery Industries, Inc., Cincinnati, Ohio

[22] Filed: Aug. 16, 1974

[21] Appl. No.: 497,917

Related U.S. Application Data

[60] Division of Ser. No. 260,516, June 7, 1972, Pat. No. 3,850,682, and a continuation-in-part of Ser. No. 223,752, Feb. 4, 1972, Pat. No. 3,769,215.

[52] U.S. Cl. ............... 428/395; 252/8.6; 252/49.5; 252/56 S; 260/78 S; 260/485 G; 428/474
[51] Int. Cl.² ...................... C08G 69/46; C08J 7/04
[58] Field of Search ........... 260/485 G, 78 S, 78 SC; 117/138.8 N, 139.5 F; 252/8.6; 428/395

[56] References Cited
UNITED STATES PATENTS 3,575,856   4/1971   Anton ................................. 252/8.9
3,694,257   9/1972   Dumont ......................... 117/139.5 F
3,769,215   10/1973   Sturwold et al. .................. 252/49.5

OTHER PUBLICATIONS

Ludewig, Polyester Fibers Chemistry and Technology, Wiley–Interscience (1964), p. 195.
Kirk–Othmer, Encyclopedia of Chemical Technology, John Wiley & Sons, Inc., Vol. 12 (1967), pp. 579 & 580.

*Primary Examiner*—Donald E. Czaja
*Assistant Examiner*—W. C. Danison, Jr.
*Attorney, Agent, or Firm*—Gerald A. Baracka; John D. Rice

[57] ABSTRACT

Ester lubricant compositions are provided which provide a good balance of lubricity and emulsifiability. The esters are derived from polyoxyalkylene glycols with a dibasic acid mixture consisting of dimer acids and short-chain dibasic acids. The emulsions are clear, homogeneous lubricant solutions provide excellent spin finishes for fibers such as polyamides and polyesters.

5 Claims, No Drawings

ESTERS OF POLYOXYALKYLENE GLYCOLS AND MIXED DIBASIC ACIDS AS FIBER FINISHES

CROSS-REFERENCES

This is a continuation-in-part of copending application Ser. No. 223,752 filed Feb. 4, 1972 now U.S. Pat. No. 3,769,215 and a division of application Ser. No. 260,516, filed June 7, 1972, now U.S. Pat. No. 3,850,682.

BACKGROUND OF THE INVENTION

Numerous synthetic lubricants including ether compounds, esters and polyesters, silicones and hydrocarbon polymers have been proposed to overcome the problems associated with the use of the natural oils and some of these are useful in aqueous systems. Many of the synthetic lubricants, however, are not readily emulsifiable with water and if an emulsion can be formed, with or without the use of additional additives, most of these emulsions begin to separate after a very short time.

Synthetic lubricants derived from dimer acids such as obtained by the dimerization of oleic acid, linoleic acid or the like have been described in U.S. Pat. Nos. 2,767,144 and 3,233,635. While extremely effective lubricants for a variety of applications such as metal working and spin finishing of fibers can be obtained through the use of dimer acids, the compatibility of the dimer-based lubricant with water is generally very poor. A dimer-based synthetic polyester lubricant having increased hydrophilic character and useful in aqueous systems is disclosed in U.S. Pat. No. 3,492,232. The polyester is derived from the reaction of 0.8 to 2.0 mols, and more preferably 1.0 to 1.5 mols, polyoxyalkylene glycol having a degree of polymerization of 4 to 200 and 1 mol of a dimer of $C_{16}$ to $C_{26}$ fatty acid. While the compositions of the U.S. Pat. No. 3,492,232 present a significant advance in the technology of dimer-based lubricants they are not without certain disadvantages. The resulting aqueous emulsions are relatively unstable and undergo partial phase separation within a very short period. Furthermore, many of the polyesters cannot be satisfactorily emulsified without the use of additional emulsifying agents of the cationic and nonionic types. Employing additional emulsifier increases the cost of the lubricant composition in addition to adding another process variable and is therefore undesirable. The stability of the emulsions can be improved through the use of higher molecular weight polyoxyalkylene glycols with the dimer, but while the use of these high molecular weight polyoxyalkylene glycols improves the physical characteristics of the emulsion it severely reduces the lubricating efficiency of the composition since the weight percent dimer acid incorporated therein is proportionately decreased.

It would be highly advantageous to have dimer acid-derived synthetic lubricants which are readily emulsifiable with water. It would be especially advantageous if stable emulsions could be formed without the use of external emulsifying aids and simply by moderately agitating the synthetic lubricant with cold tap water. Additional benefit would be derived if synthetic lubricants employing low molecular weight polyoxyalkylene glycols with dimer acid could be prepared so that a high weight percent dimer acid could be obtained; if these lubricants were readily emulsifiable without the use of external emulsifying agents; and if the resulting emulsions were stable.

SUMMARY OF THE INVENTION

We have now discovered that improved ester lubricant compositions derived from dimer acid and polyoxyalkylene glycols are obtained by incorporating therein an amount of short-chain dibasic acid. The ester mixtures of this invention are more readily emulsifiable with water than polyesters derived from polyoxyalkylene glycol and dimer acid alone. Stable emulsions are obtained with the lubricant compositions of this invention without the use of external emulsifying aids. Quite unexpectedly it has been found that the incorporation of the short-chain dibasic acid permits the use of low molecular weight polyoxyalkylene glycols with the dimer acid and that the resulting mixed ester compositions, in addition to having increased lubricity as a result of the high weight percent dimer acid present, also have superior emulsification properties. This invention provides synthetic ester lubricants which have a good balance of emulsification and lubrication properties. A further advantage and completely unexpected result is the discovery that clear, homogeneous lubricant solutions can be prepared when the molar ratio of the polyoxyalkylene glycol, dimer acid and short-chain dibasic acid is within certain defined limits.

The ester lubricants of the present invention are obtained by the condensation reaction of polyoxyalkylene glycols having molecular weights ranging from 300 to 4000 and more preferably in the range 400 to 1000, a dimer acid containing from about 32 to 54 carbon atoms and a short-chain dibasic acid containing from 2 to 12 carbon atoms and more preferably from about 6 to 10 carbon atoms. The molar ratio of dibasic acids dimer acid plus short-chain dibasic acid) to polyoxyalkylene glycol will be 1:1.5 – 2.1. The dimer acid will constitute from about 95 to 5 mol percent of the total dibasic acid while the short-chain dibasic acid will range from about 5 to 95 mol percent. Excellent results are obtained when about 90 to 20 mol percent of the total dibasic acid is short-chain dibasic acid. To obtain water-soluble ester lubricants about 7.5 to about 20% by weight short-chain dibasic acid, based on the overall ester composition, is employed. The water-soluble ester products have acid values of about 15 or below. The concentration of the ester in aqueous emulsions or solutions useful as lubricants will generally range from about 0.1 to 25% by weight of the lubricant composition.

DETAILED DESCRIPTION

The ester lubricants of this invention are condensation products of polyoxyalkylene glycols with a mixture of dibasic acids and short-chain dibasic acids. These ester compositions are useful as lubricants and are readily emulsifiable with water without the addition of external emulsifying agents.

To obtain the lubricant esters of this invention, a polyoxyalkylene glycol having a molecular weight from about 300 to about 4000, and more preferably from 400 to 1000, is employed. The recurring alkylene groups may contain 2 to 4 carbon atoms and useful polyoxyalkylene glycols having varying degrees of polymerization include: polyethylene glycols, polypropylene glycols, polybutylene glycols, poly(ethylenepropylene) glycols and the like. Polyethylene glycols having molecular weights from 400 to about 1000 are especially useful and are available from commercial suppliers under the trade designations "Carbowax" and "Polyox" or they may be synthesized in the conventional manner. The molecular weights recited above indicate the average molecular weight of the polyoxyalkylene glycol and it is understood that these compositions are mixtures of polyoxyalkylene glycols having widely divergent molecular weights. Polyoxyalkylene glycols having molecular weights less than about 300 or greater than about 4000 should not, however, be present in significant amounts.

Condensed with the polyoxyalkylene glycol is a mixture of dibasic acids consisting of dimer acid and short-chain dibasic acid. The molar ratio of the dibasic acids, including both the dimer acid and the short-chain dibasic acid, to the polyoxyalkylene glycol will range from about 1:1.5–2.1 with exceptional results being obtained when the molar ratio is 1:1.75–2.0. The proportion of dimer and short-chain dibasic acids may be widely varied.

Useful dimer acids for the compositions of this invention contain from about 32 to 54 carbon atoms. The dibasic acids may be obtained by processes known to the art, however, they are most frequently obtained by the polymerization of monocarboxylic acids containing ethyleneic unsaturation. The monocarboxylic unsaturated acids generally contain from about 16 to 26 carbon atoms and include, for example, oleic acid, linoleic acid, eleostearic acid and similar singly or doubly unsaturated acids. To obtain the preferred dimer acids 2 mols of the unsaturated monocarboxylic acid are reacted, i.e., dimerized. If the resulting dimer acid contains ethyleneic unsaturation it may be beneficial to hydrogenate it to obtain the saturated material prior to reaction with the polyoxyalkylene glycol. Mixtures of dimer acids may be employed. Trimer and tetramer acids may also be present with the dimer acid and do not adversely affect the lubricant properties of the resulting ester compositions so long as about 50% by weight of the mixture are polymerized acids. Commercially available compositions sold under the trademark "Empol", mixtures of polymerized fatty acids with dimer acid as the major constituent, may be advantageously employed. Especially useful are mixed acid products which will contain 75 weight percent or more dimer acid with the remainder being unpolymerized fatty acids or more highly polymerized acids such as trimer acids.

The short-chain dibasic acids contain from 2 to about 12 carbon atoms. Short-chain dibasic acids containing 6–10 carbon atoms are especially preferred for the present invention. Typical short-chain dibasic acids include oxalic acid, malonic acid, succinic acid, glutaric acid, adipic acid, azelaic acid, sebacic acid, dodecanedioic acid and the like. Mixtures of one or more short-chain dibasic acids may be used.

The dibasic acid mixture consists of about 95 to 5 mol percent dimer acids with about 5 to 95 mol percent of one or more short-chain dibasic acids. Preferred ester lubricant compositions contain from about 80 to 10 mol percent short-chain dibasic acid and from 90 to 20 mol percent of the dimer.

The condensation of the polyoxyalkylene glycol with the dimer and short-chain dibasic acids is conducted employing conventional esterification techniques, that is, by heating the reaction mixture with or without a catalyst at a temperature from about 100° to 300°C while removing the water of reaction. The reactions are most generally conducted over the temperature range 175° to 250°C. It is not necessary that a catalyst be employed for the esterification reaction, however, conventional acid catalysts such as sulfuric acid, alkyl and aryl sulfonic acids such as p-toluene sulfonic acid, phosphorous acids or the like may be employed. The reaction may be carried out in a diluent which is inert to the reaction conditions employed and which, preferably, will form an azeotrope with water to facilitate the removal of the water of reaction. The amount of reactants employed is in accordance with the molar ratios set forth above. For preparation of suitable ester lubricants it is undesirable for the esterification reaction to be less than about 70% complete, that is, 70% or more of the carboxyl groups should be reacted. The reaction is more generally continued to approximately 85% completion. This may be determined by measurement of the acid value or hydroxyl value or by measuring the amount of water evolved. For the preparation of certain preferred ester lubricants which are water-soluble it is preferred that the reaction be continued until it is 90% complete or even higher or, in terms of acid value, the reaction mixture has an acid value of about 15 or below.

As an alternative procedure for the preparation of the present ester lubricants, the dimer and short-chain dibasic acid may be reacted in the presence of ethylene oxide. In this way the polyoxyethylene glycol would be prepared in situ. Suitable catalysts and diluents could be added. It is generally found, however, that more uniform control of molecular weight of the products is obtained when the polyoxyethylene glycol is separately prepared.

Small amounts of other compounds capable of entering into the reaction may also be included with the polyoxyalkylene glycol, dimer and short-chain dibasic acid and are within the scope of the present invention. Aromatic dibasic acids, diols and polyols, diamines and polyamines may be employed in amounts which do not detract from the emulsification and lubrication properties to modify the resulting lubricant composition. For example, the use of diamines, such as dimethylaminopropylamine, may be desirable to enhance the anticorrosion properties of the ester if it is to be used as a metalworking lubricant. The amount of these materials will not exceed about 10% and more preferably 5% by weight of the overall ester composition.

The esters of the present invention provide a convenient means to obtain a good balance of lubrication and emulsification properties which was not previously possible when polyoxyalkylene glycols were simply reacted with dimer acids without the addition of short-chain dibasic acids. To achieve good lubrication properties with the prior art polyesters would require that the emulsification properties be compromised. Even if additional external emulsifying aids were added, the resulting emulsions were not always completely satisfactory and in most instances they would begin to separate after a very short time. Acceptable emulsions can be produced employing the teachings of the prior art if the amount of dimer acid is diminished, however, this results in a marked decrease in the lubrication properties. For example, a polyester prepared by the condensation of dimer acid with a polyethylene glycol of molecular weight 2000 or greater in accordance with prior art procedure would form an acceptable emulsion, but the lubrication properties would be inferior and unacceptable for most applications. If, in accordance with the prior art procedure, a polyester was formed from a dimer acid and a polyethylene glycol of low molecular weight about 400, the lubrication properties of the polyester would be greatly enhanced but the material would not emulsify readily or the emulsion, if formed, would not be stable.

In accordance with the present invention we have prepared mixed ester lubricants which are, at the same time, readily emulsifiable and excellent lubricants. This is accomplished by replacing a portion of the dimer acid with a short-chain dibasic acid. In this way lower molecular weight polyoxyalkylene glycols can be employed without reducing the hydrophilic character of the resulting ester and emulsfiability is comparable or superior to compositions containing much larger proportions of the hydrophilic moiety. Also by the use of low molecular weight polyoxyalkylene glycols, the weight percent of the dimer acid present in the resulting ester mixture may be proportionately increased with the result that the lubricity of the ester compositions is markedly enhanced. Thus, the present ester lubricant compositions provide the proper balance of dimer (which contributes to the lubricity) and polyoxyalkylene glycol (which contributes to the emulsifiability) so that exceptionally useful products are obtained. When very high molecular weight polyoxyalkylene glycols are reacted with dimer acid in the absence of a short-chain dibasic acid the lubrication properties of the resulting ester products are impaired. Similarly, when very low molecular weight polyoxyalkylene glycols are employed the emulsifiability is poor and the product unacceptable.

While the ability of the present invention to provide ester compositions having excellent lubricating and emulsifying properties is in itself very useful, a preferred embodiment of this invention is even more advantageous since it provides completely water-soluble ester lubricants. The water solutions are clear and homogeneous in all proportions. To obtain the water-soluble ester compositions the lubricant ester will contain from about 7.5 to about 20% by weight of the short-chain dibasic acid and have an acid value of about 15 or below. Acid values above about 15 are unacceptable if clear solutions are to be obtained. It is unexpected that as the acid value of the ester composition is decreased the water solubility or hydrophilic character of the esters is increased. The solutions produced in accordance with this preferred embodiment are stable and do not discolor or become cloudy upon standing. The esters have excellent lubricity in addition to being completely water-soluble and may be successfully used in various metal working operations and as fiber finishes.

The lubricants of this invention are useful for working metals as aqueous emulsions or as the clear aqueous solutions. The concentration of the ester for this purpose will generally range from about 0.1 to about 25% by weight of the emulsion or solution although these esters mix with water in all proportions. The lubricant formulations may be added to the metal-working elements or the metal itself by spraying or with other similar equipment and form a uniform continuous film between the rolls and the metal, thereby reducing friction and heat buildup. These lubricants are useful for working both ferrous and nonferrous metals and they may be formulated with other additives such as stabilizers, corrosion inhibitors and the like depending on the end-use application.

The present ester compositions are also useful as an overfinish for polymeric fibers derived from materials such as polyolefins, polyamides, polyacrylonitriles and polyesters. Such finishes are required during the processing of the fibers into yarns and fabrics to increase the surface lubricity thereby reducing fiber-fiber friction and friction between the fiber and guides, draw pins, etc., of the processing equipment. Use of these finishing agents minimizes damage to the fibers, decrease filament breakage and facilitate the various processing steps. The ester compositions of this invention also reduce static charge buildup in the fibers during the processing. The esters of this invention are especially useful with polyesters and polyamides and they significantly improve the lubricity of the fibers and improve the resistance to static electrical charge buildup.

Polyesters for which the present compounds, particularly the poly (ethylene glycol) dimerates, are useful include any of the condensation polymers obtained when one or more diols are reacted with one or more dibasic acids or suitable derivatives thereof. They are also useful with copolyesters and modified copolyesters. Glycols from which useful polyesters are obtained generally have the formula

wherein $n$ is an integer from about 2 to 10. Such glycols include ethylene glycol, 1,3-propanediol, 1,5-pentanediol, 1,6-hexanediol, 1,7-heptanediol, 1,8-octanediol, 1,9-nonanediol, 1,10-decanediol and the like. Dicarboxylic acids typically employed include terephthalic acid, isophthalic acid, adipic acid, sebacic acid, succinic acid, oxalic acid, glutaric acid, pimelic acid, suberic acid, azelaic acid, and the like. In addition to these more common diols and dicarboxylic acids and other useful reactants might include glycerol, sorbitol, pentaerythritol, methoxypolyethylene glycol, neopentyl glycol monohydroxypivalate, trimethylol propane, trimesic acid, p,p'-dicarboxydiphenylmethane, p,p'-dicarboxydiphenoxyethane, p-carboxyphenoxy acetic acid and the like. Especially useful polyesters for the purpose of the present invention are poly(ethylene terephthalate) and poly(1,4-cyclohexylenedimethylene terephthalate) because of their commercial availability and superior fiber-forming characteristics.

The present compositions are also useful as spin finishes to lubricate and provide protection against static charge buildup with polyamides formed by the reaction of dicarboxylic acids, such as described above for the preparation of polyesters, and a diamine or suitable derivative thereof. Diamines which may be employed have the general formula

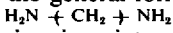

wherein $n$ is an integer from about 2 to 10, such as ethylenediamine, propylenediamine, tetramethylenediamine, pentamethylenediamine, hexamethylenediamine, decamethylenediamine and the like. Nylon-6 and nylon-6,6, are especially useful for the present invention. Polyamides derived from the reaction of certain amino acids such as 6-aminocaproic acid, 7-aminoheptanoic acid, or the lactams of these acids, may also be treated in accordance with the present invention.

In general, the esters of this invention may be employed with any polymeric material as a lubricant and to obtain improved resistivity to static electrical charge buildup. The emulsions or solutions of the esters can be applied to the polymer powder, on the surface of formed objects such as pellets, rods, fibers, filaments, yarns, etc. When employed as a fiber finish the concentration of the ester and the pickup are controlled to give the final weight of ester desired for acceptable processing. Finishes are typically applied to the fiber by passing the fiber through a bath or over a saturated roll containing the emulsion or solution or by directly spraying the fiber. The esters may be added to polyesters, polyamides or other fiber-forming polymers by themselves or in combination with other additives such as stabilizers, plasticizers, additional lubricants and antistatic agents and the like.

The esters may be incorporated into the polyester, polyamide or other polymeric material using conventional mixing equipment. They may be added directly to the polymerizer while the polymer is being formed or reacted with a suitable prepolymer. The addition may be made at any stage of the polymerization, in toto, incrementally or by proportioning, the manner and mode of addition being governed by the relative reactivities of the reactants and reaction conditions employed. Using this technique the ester becomes an integral part of the polymer structure and consequently imparts some permanence to the lubricant and antistatic properties. The amount of ester reacted into the polymer will vary depending on the number of reactive groups available on the ester. As will be recognized by the person skilled in the art, numerous variations are possible depending on the particular end-use application and are within the scope of the present invention. Irrespective of the method of treating the polymer with the ester to obtain the properties heretofore described, the ester will constitute from about 0.1 to 10%, and more preferably from 0.2 to 2.5% by weight, of the polymer composition.

The following examples illustrate this invention more fully, however, the examples are not intended to limit the scope of the invention. All parts and percentages in the examples are given on a weight basis unless otherwise stated.

EXAMPLE I

To a glass reactor equipped with a stirrer, thermometer and water trap were charged 1030 grams (0.9 equivalent ratio) of dimer acid (Empol 1018 containing 83% $C_{36}$ dibasic acid), 37.6 grams (0.1 equivalent ratio) azelaic acid and 1600 grams (2.0 equivalents) polyethylene glycol having an average molecular weight of 400. The reaction mixture was heated with stirring to about 200°C and held for approximately 4 hours during which time 51 mls of water were removed. A vacuum of about 1 torr was pulled on the system to remove additional water of reaction. After one hour the reaction mixture was sampled and had an acid value of about 15.5. Heating was continued under vacuum for four more hours before the reaction mixture was cooled and poured up. The resulting lubricant ester composition had a final acid value of 6.7, hydroxyl value of 93.1, viscosities (ASTM D 445–65) at 100°F and 210°F of 548 cs and 70.4 cs, respectively, and flash and fire points (ASTM D 92-66) of 555°F and 605°F, respectively.

A portion (20 mls) of the ester composition was poured into 100 mls of cold tap water while stirring with a glass rod. An emulsion was immediately obtained. This emulsion was stable and showed no signs of signs of phase separation after standing 48 hours at room temperature. Even after a week's time the emulsion appeared homogeneous. A sample prepared identically but with the azelaic acid excluded from the mixture was only difficulty emulsifiable. To obtain an emulsion required vigorous agitation with a mechanical stirrer. When this emulsion was allowed to stand at room temperature there was appreciable phase separation after only 24 hours with signficant amounts of the oil settling to the bottom of the beaker.

To demonstrate the effectiveness of the ester compositions of this invention as lubricants they were evaluated with a Falex machine. This machine provides a convenient and reliable means to determine the film strength or load-carrying properties of materials as extreme pressures are applied. Falex testing is recognized throughout the industry as a means of measuring the relative effectiveness of various lubricants. The Falex wear test (ASTM D 2670-67) employs a 60 gram sample when the straight ester is being evaluated. A 600 gram sample is used when aqueous emulsions or solutions of the ester are to be tested. The loading device is attached and the cup containing the sample being evaluated positioned so that the steel pin and blocks are completely immersed in the sample. The load is then increased to 350 lbs and run for 5 minutes. After this time the load is further increased to 1000 lbs and maintained for 30 minutes when testing straight oils or one hour when evaluating lubricant emulsions or solutions. Readings are taken at the beginning of the hour, after thirty minutes, and at the end of the hour and the difference in the readings indicates the amount of wear.

Three samples of the lubricant ester composition of this example were evaluated in accordance with the described test procedure. The straight oil was evaluated and also 10% and 5% aqueous emulsions were tested. Test results obtained are as follows:

| SAMPLE | UNITS WEAR |
|---|---|
| Straight ester: after 30 minutes | 18 |
| after 60 minutes | 30 |
| 10% aqueous emulsion: after 30 minutes | 154 |
| 5% aqueous emulsion: after 30 minutes | 174 |

When the above experiment was repeated employing a polyethylene glycol having an average molecular weight of about 800 similar results were obtained. The ester compositions were readily emulsifiable and the emulsions had excellent stability. A 4% aqueous emulsion of this ester exhibited superior lubricating properties in the Falex test and performed acceptably as a cutting oil with cold steel.

EXAMPLE II

Employing identical reactants and a similar procedure to that described in Example I, 715 grams (0.5 equivalent ratio) dimer acid, 235 grams (0.5 equivalent ratio) azelaic acid and 2000 grams (2.0 equivalents ratio) polyethylene glycol were heated at 200°C for 6 hours during which time 55 mls of water were removed. An additional 10 mls of water was taken off after pulling a vacuum on the system for one hour. The ester reaction mixture at this stage had an acid value of 19.8 and readily formed an emulsion with water. Additional heating of the reaction mixture for 2 hours under vacuum reduced the acid value to 12.1. The ester (containing about 8 weight percent azelaic acid) had a hydroxyl value of 105; viscosity at 100°F of 316 cs, viscosity at 200°F of 36.6 cs, and flash and fire points of 530° and 585°F, respectively. The ester readily dissolved in water in all proportions. No cloudiness was observed - the resulting solutions were clear and homogeneous.

Falex wear tests gave the following results:

| SAMPLE | UNITS WEAR |
|---|---|
| Straight ester: after 30 minutes | 30 |
| after 60 minutes | 67 |
| 10% water solution: after 30 minutes | 132 |
| 5% water solution: after 30 minutes | 146 |

EXAMPLE III

A water-soluble ester lubricant containing about 8% by weight adipic acid was obtained from the reaction of 0.4 equivalent dimer acid (83% $C_{36}$ dibasic acid), 0.6 equivalent adipic acid and 2.0 equivalents polyethylene glycol having a molecular weight of 400. The reaction was continued until an acid value of 10.3 was achieved. The resulting ester composition had a viscosity of 163 cs at 100°F. The ester lubricant mixed with water in all proportions to give clear solutions. Water solutions containing 10 and 5% of the so-prepared ester were evaluated in the Falex test machine and showed only 132 and 156 units of wear, respectively, after 30 minutes testing at 1000 psi.

Repeating the above example using 0.5 equivalent dimer acid and 0.5 equivalent adipic acid and running the reaction to an acid value of 12.9 gave useful ester lubricants. These compositions when mixed with water did not give clear solutions but did form stable emulsions without the use of external emulsifying aids. The emulsions had excellent shelf lives and were effective lubricants.

EXAMPLE IV

When Example I was repeated using 0.7 equivalent dimer acid, 0.3 equivalent azelaic acid and 2.0 equivalents polyethylene glycol, a useful ester lubricant composition having an acid value of 9.1 was obtained. The ester had a viscosity of 425 cs at 100°F and was readily emulsifiable in cold tap water with minimal stirring and without addition of external emulsifying aids. The emulsion so-produced had excellent shelf life and was an efficient lubricant. A 5% aqueous emulsion of this ester gave less than 150 units wear in the Falex machine after 30 minutes at 1000 psi.

Ester lubricant compositions were also prepared which incorporated up to 0.2 equivalent of an amine corrosion inhibitor such as diethanolamine or dimethylaminepropylamine. The presence of these amines significantly improved the corrosion properties of the lubricant composition without adversely affecting the emulsion and lubrication characteristics. In some instances the amines enhance the emulsion properties of the ester composition even at reduced polyethylene glycol levels.

EXAMPLE V

Example I was repeated using 0.8 equivalent dimer acid, 0.2 equivalent azelaic acid and 2 equivalents polyethylene glycol. The lubricant ester (acid value 15.5) was easily emulsified. Stable emulsions were obtained which were useful cutting oils when used with a tungsten carbide bit.

EXAMPLE VI

To demonstrate the ability of the present esters to function as fiber/metal lubricants and improve the resistance of the so-lubricated fibers to static charge buildup several of the ester products were applied as finishes to polyester yarn and compared against a commercially available product used by the industry as a component for textile finishes. Three samples (A–C) were prepared and applied at 0.5% o.w.f. on 150 denier polyester yarn which had been solvent-stripped to remove any finish applied by the producer. Samples A and B contained the esters of Examples I and II, respectively, while Sample C was prepared with Emerest 2650 a product of Emery Industries, Inc., identified as polyethylene glycol 400 monolaurate. The finishes were all applied from aqueous systems with an Atlab Finish Applicator and the treated fibers then conditioned for 24 hours at 70°F and 65% relative humidity prior to testing. Frictional properties were measured with a Rothschild F-Meter with the initial tension held constant at 10 grams, a yarn speed of 100 M/minute and yarn/metal contact angle of 180°. Test results are reported below. Antistatic properties were also determined by insulating one of the pulleys on the F-meter and connecting it to a voltmeter and measuring the static charge produced on the pulley after an eight-second interval. The voltage "buildup" is reported in the table below. A static measurement for antistatic properties was made by placing a 100 volt charge on a strand of the yarn connected to a ground and determining the time required for the charge to dissipate to 50 volts. This data is reported in the table below under the column headed "Bleed-off".

| Sample | $t_2(g)$ | f | Buildup (V) | Bleed-off (Sec)) |
|---|---|---|---|---|
| A | 37 | 0.39 | 500 | 30 |
| B | 30 | 0.32 | 350 | 10 |
| C | 22 | 0.22 | 625 | 12 |

The above data demonstrates the ability of the esters of this invention to reduce fiber/metal friction and to impart antistatic properties to polyester yarns treated therewith. The antistatic properties obtained were superior in both the static and dynamic testing to properties obtained with the commercial product. Reduction of friction compared favorably with the commercial product.

EXAMPLE VII

Single strand nylon (Dupont 15847) was immersed in 0.5% water emulsion/solution of the following:

| Sample | Additive |
|---|---|
| A | Product of Example I |
| B | Product of Example II |

The fibers were then conditioned at 68°F and 40% relative humidity and tested using the static bleed-off test. Results were as follows:

| Fiber treated with | Minutes to 50% Bleed-off |
|---|---|
| A | 11.08 |

| Fiber treated with | Minutes to 50% Bleed-off |
|---|---|
| B | 7.76 |

A fiber which was not treated with either of the above solutions showed no dissipation of charge even after 10 minutes.

We claim:

1. A lubricated fiber comprising a polyamide having deposited thereon about 0.1 to 10% by weight of an ester obtained by the reaction of 1.5 to 2.1 mols polyoxyethylene glycol having a molecular weight from about 300 to about 4000 and recurring alkylene units containing from 2 to 4 carbon atoms with 1 mol of a mixture of dibasic acids consisting of 5 to 95 mol percent dimer hydrocarbon acids containing 32 to 54 carbon atoms and 95 to 5 mol percent short-chain dibasic hydrocarbon acids containing 2 to 12 carbon atoms, said ester having 70% or more of the carboxyl groups reacted.

2. The lubricated fiber of claim 1 wherein the polyoxyalkylene glycol is a polyethylene glycol of molecular weight 400 to 1000 and the dibasic acid mixture mixture contains from 20 to 90 mol percent short-chain dibasic hydrocarbon acids containing 6 to 10 carbon atoms.

3. The lubricated fiber of claim 2 werein the mol ratio of dibasic acids to polyoxyethylene glycol is 1:1.75-2.0 and more that 85% of the carboxyl groups of the dibasic acids are reacted.

4. The lubricated fiber of claim 3 wherein the acid value of the ester is 15 or below and the short-chain dibasic hydrocarbon acid comprises about 7.5 to 20 weight percent of the ester.

5. The lubricated fiber of claim 4 wherein the short-chain dibasic acid is azelaic acid and the polyamide is nylon-6 or nylon-6,6.

* * * * *